Figures 1, 2:
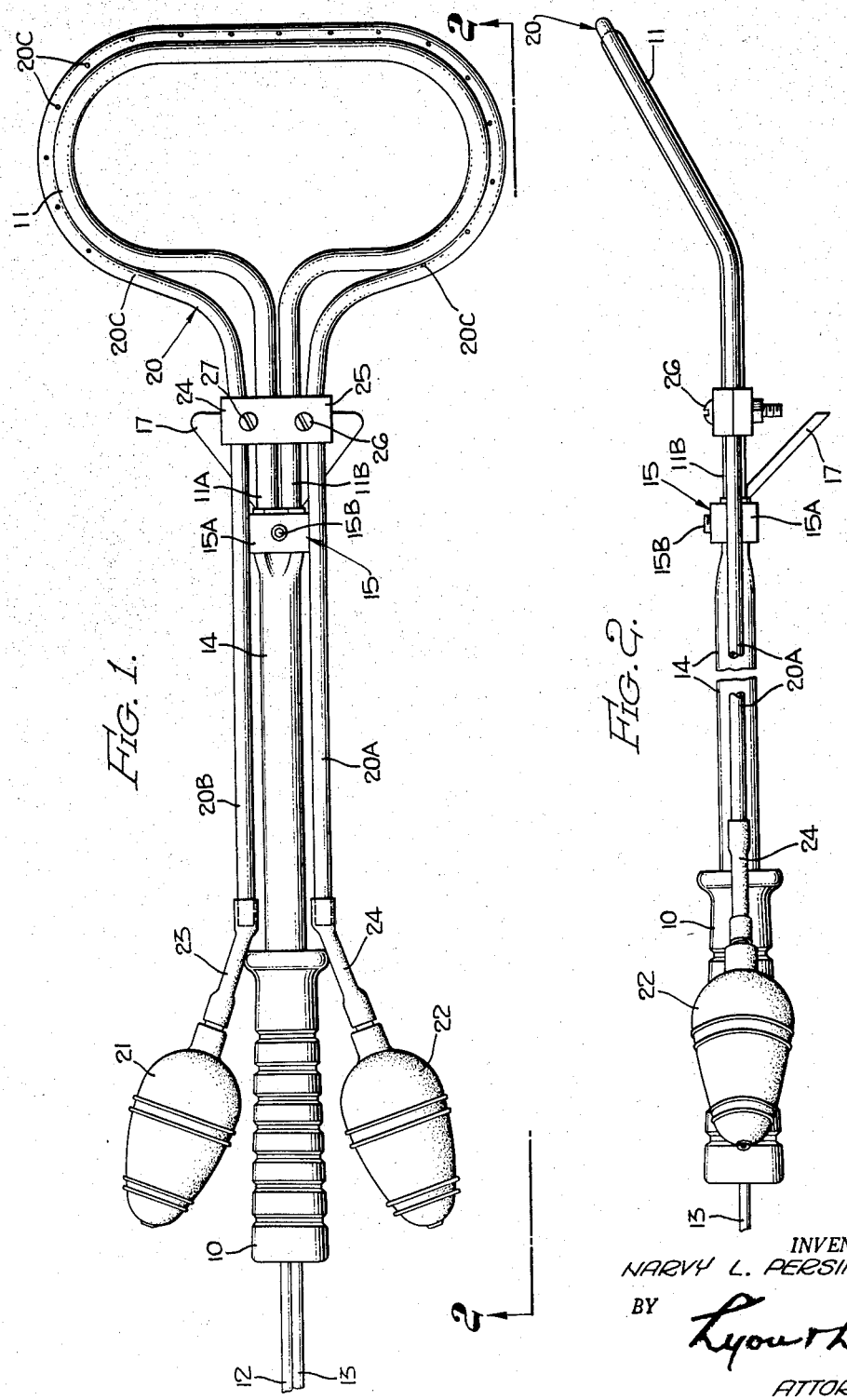

Jan. 19, 1960 N. L. PERSINGER 2,922,016
BARBECUE IGNITING DEVICE
Filed June 16, 1958

INVENTOR,
NARVY L. PERSINGER
BY
Lyon & Lyon
ATTORNEYS 2,922,016
Patented Jan. 19, 1960

2,922,016

BARBECUE IGNITING DEVICE

Narvy L. Persinger, Burbank, Calif.

Application June 16, 1958, Serial No. 742,388

4 Claims. (Cl. 219—32)

The present invention relates to a heating means and in particular, to an improved device for starting barbecue fires.

Charcoal briquets are usually used in barbecue equipment and often much time and difficulty is encountered in properly igniting the charcoal briquets, particularly so after the fire from the briquets has been extinguished by water after prior use.

Electrical heating units have previously been proposed for igniting or preheating charcoal briquets. These, however, have not been too satisfactory, particularly so when the user is unacquainted with proper use of the electrical heating element and attempts to ignite the briquets by simply piling briquets on the heating unit without some underlying briquets to assure a natural draft.

In accordance with the present invention, an electrical heating element is provided which incorporates means whereby a draft may be induced and thus, in the use of the heating device, it is immaterial whether the user has an underlying bed of briquets or simply piles all the briquets on the heating unit.

It is, therefore, an object of the present invention to provide an improved electrical heating unit for barbecue equipment such as braziers and the like, having means for producing a draft to aid in properly igniting the charcoal briquets.

Another object of the present invention is to provide an improved electrical heating unit which allows all of the briquets to be piled on it without the necessity of otherwise providing means for assuring a flow of air or draft by preplacement of underlying briquets.

Another object of the present invention is to provide improved electrical heating device of this character which is effective in starting a barbecue fire in a short time, even though the briquets may be saturated to some extent with water due its use in their prior extinguishment.

Another object of the present invention is to provide means for inducing a draft which may be readily attached to existing electrical units.

The features of the present invention which are believed to be novel are set forth with particularity in the appended claims. This invention iself, both as to its organization and manner of operation, together with further objects and advantages thereof, may be best understood by reference to the following description taken in connection with the accompanying drawings in which:

Figure 1 is a top plan view of an electrical heating device embodying features of the present invention; and Figure 2 is a view in side elevation of the same.

The electrical heating device shown in the drawings has a handle 10 and a heating unit 11 in the form of a "Calrod" unit which is supplied with current through flexible leads or cord 12, 13 extending outwardly from the handle 10. It is noted that the heating unit 11 is in the form of a loop and comprises an outer metallic tube having its adjacent ends 11A and 11B extending into and supported by the metallic sleeve 14 which, in turn, is supported by the handle 10 of insulated material. For this latter purpose, the ends 11A and 11B which extend in the tube 14 are clamped to the tube 14 by a clamping structure 15 which comprises a metal block 15A which has a rectangular opening therethrough so as to encircle the end of tube 14 and such block 15A has a setscrew 15B screwed therein to maintain the heating unit ends 11A and 11B clamped within the sleeve 14 of deflammable material. Also, if desired, a generally triangular supporting plate 17 may be clamped to the sleeve 14 by the same clamping structure 15.

In accordance with one important aspect of the present invention, a hollow metallic draft tube 20 is formed as shown in Figure 1 to lie adjacent the outer perimeter of the looped unit 11 and such tube 20 has a pair of parallel extending portions 20A and 20B on opposite sides of the sleeve 14, such ends 20A and 20B terminating close to the handle 10 and having mounted thereon a pair of corresponding rubber bulbs 21 and 22 which are connected to the ends 20A and 20B by flexible rubber tubing 23 and 24.

The tube 20, as shown in Figure 1, has a series of spaced apertured portions 20C and it will be observed that such apertured portions 20C are only in that portion of the tube 20 which encircles the looped portion of the electrical heating unit 11.

In use of the device described, charcoal briquets are placed on the looped portion of the heating element 11 either before or after such briquets may have had poured thereon some igniting fluid. The heating current is then applied through the flexible cord 12 and 13 in which the resulting heat is developed due to the resistance of the unit 11. While the unit 11 is thus being heated, the operator alternately squeezes the rubber bulbs 21 and 22, the bulb 21 being squeezed by his left hand and the bulb 22 being squeezed by his right hand. This results in a flow of air through the apertured portions 20C which lie in close proximity to the heating element 11 so as to produce a draft through the charcoal briquets and thus cause the briquets to be brought into condition for barbecue much sooner and more expeditiously than would otherwise be the case. For these purposes, the draft tube 20 is conveniently supported at only one point and by a pair of clamping straps 24 and 25 through which a pair of bolts 26 and 27 extend for clamping the draft tube 20 on the end portions 11A, 11B of the heating element.

It is understood that while two flexible bulbs are preferred so that a continuous draft may be produced by alternately squeezing and releasing the bulbs 21, 22, in some forms only one bulb may be used but this has the disadvantage that the squeezing and releasing of only one bulb results in a lesser flow of air and further, that the flow of air is not as continuous as when a pair of bulbs, as shown, are alternately squeezed and released.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. An igniting device of the character described comprising a handle portion, an electrical heating unit in the form of a loop, said loop having a pair of parallel extending end portions, means clamping said end portions on said handle portion, a complementary draft tube encircling said loop and having ends which are on opposite sides of said handle portion and which extend generally parallel with said handle portion, means for clamping said tube on said end portions of said heating element, and a squeezable bulb in communication with one end of said tube, said tube having apertured portions therein adjacent to said loop.

2. An igniting device of the character described comprising a handle portion, an electrical heating unit in the form of a loop, said loop having a pair of parallel extending end portions, means mounting said end portions on said handle portion, a complementary draft tube encircling said loop and having ends which are on opposite sides of said handle portion and which extend generally parallel with said handle portion and with said end portions, a pair of clamping straps between which said end portions and said ends are sandwiched, means securing said straps together to maintain said tube on said unit, said tube having apertured portions therein adjacent to said loop, and a squeezable bulb in communication with one end of said tube.

3. A device as set forth in claim 2 in which the unit and tube are circular in cross section with the diameter of said tube being smaller than said unit.

4. A device as set forth in claim 2 in which said straps and securing means provide the sole means whereby said tube and unit are maintained together, and said securing means being releasable to allow convenient assembly and disassembly.

References Cited in the file of this patent

UNITED STATES PATENTS

| | | |
|---|---|---|
| 1,614,785 | Fraser | Jan. 18, 1927 |
| 2,192,732 | Johnson | Mar. 5, 1940 |
| 2,210,720 | Johnson et al. | Aug. 6, 1940 |
| 2,246,719 | Burnham | June 24, 1941 |
| 2,492,705 | Mason | Dec. 27, 1949 |
| 2,549,806 | Hall | Apr. 24, 1951 |
| 2,701,294 | Hebert | Feb. 1, 1955 |

FOREIGN PATENTS

| | | |
|---|---|---|
| 628,860 | France | July 11, 1927 |
| 720,416 | Germany | May 5, 1942 |
| 920,762 | France | Jan. 4, 1947 |